(12) United States Patent
Lin (10) Patent No.: US 11,582,007 B2
(45) Date of Patent: Feb. 14, 2023

(54) APPARATUSES AND METHODS FOR RESOURCE UNIT (RU) ALLOCATION SIGNALING TO SUPPORT TRIGGER-BASED PHYSICAL LAYER PROTOCOL DATA UNIT (TB PPDU) WITH MULTI-RU

(71) Applicant: MEDIATEK INC., Hsinchu (TW)

(72) Inventor: Ying-You Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 89 days.

(21) Appl. No.: 17/142,333

(22) Filed: Jan. 6, 2021

(65) Prior Publication Data

US 2021/0351894 A1 Nov. 11, 2021

Related U.S. Application Data

(60) Provisional application No. 63/020,582, filed on May 6, 2020.

(51) Int. Cl.
*H04L 5/00* (2006.01)
*H04W 72/04* (2023.01)
*H04W 72/0446* (2023.01)
*H04W 84/12* (2009.01)

(52) U.S. Cl.
CPC ....... *H04L 5/0053* (2013.01); *H04W 72/0413* (2013.01); *H04W 72/0446* (2013.01); *H04W 84/12* (2013.01)

(58) Field of Classification Search
CPC ............ H04L 5/0053; H04W 72/0413; H04W 72/0446; H04W 84/12
See application file for complete search history.

(56) References Cited

U.S. PATENT DOCUMENTS

| | | | |
|---|---|---|---|
| 10,219,271 B1 * | 2/2019 | Hedayat | H04L 5/0055 |
| 2019/0116545 A1 | 4/2019 | Verma et al. | |
| 2019/0124556 A1 | 4/2019 | Verma et al. | |
| 2020/0015219 A1 | 1/2020 | Asterjadhi et al. | |
| 2020/0177425 A1 * | 6/2020 | Chen | H04L 5/0023 |
| 2020/0304266 A1 * | 9/2020 | Chu | H04L 5/0053 |
| 2021/0044381 A1 * | 2/2021 | Xin | H04L 1/0071 |
| 2021/0250119 A1 * | 8/2021 | Noh | H04L 1/0033 |
| 2021/0274507 A1 * | 9/2021 | Porat | H04W 72/082 |

OTHER PUBLICATIONS

European Search Report dated Oct. 13, 2021, issued in application. EP 21170846.6.

* cited by examiner

*Primary Examiner* — Duc C Ho (74) *Attorney, Agent, or Firm* — McClure, Qualey & Rodack, LLP (57) ABSTRACT

A wireless communication terminal operating as a Station (STA) is provided. The wireless communication terminal includes a wireless transceiver and a controller. The wireless transceiver performs wireless transmission and reception to and from an Access Point (AP). The controller receives a trigger frame including a Resource Unit (RU) Allocation subfield which has one bit to indicate support of 320 MHz bandwidth from the AP via the wireless transceiver, determines a combination of RUs to be used in a Trigger-Based Physical layer Protocol Data Unit (TB PPDU) according to the RU Allocation subfield, and sends the TB PPDU for Uplink (UL) data transmission to the AP via the wireless transceiver in response to the trigger frame.

18 Claims, 10 Drawing Sheets

| AID12 | RU Allocation | UL FEC Coding Type | UL MCS | UL DCM | SS Allocation/RA-RU Information | UL Target RSSI | Reserved | Trigger Dependent User Info |
|---|---|---|---|---|---|---|---|---|
| Bits: 12 | 9 | 1 | 4 | 1 | 6 | 7 | 1 | variable |

| AID12 | Num of RUs | RU Allocation 1 | RU Allocation 2 | UL FEC Coding Type | UL MCS | UL DCM | SS Allocation/ RA-RU Information | UL Target RSSI | Reserved | Trigger Dependent User Info |
|---|---|---|---|---|---|---|---|---|---|---|
| 12 | 3 | 9 | 9 | 1 | 4 | 1 | 6 | 7 | 1 | variable |

Bits:

APPARATUSES AND METHODS FOR RESOURCE UNIT (RU) ALLOCATION SIGNALING TO SUPPORT TRIGGER-BASED PHYSICAL LAYER PROTOCOL DATA UNIT (TB PPDU) WITH MULTI-RU

CROSS REFERENCE TO RELATED APPLICATIONS

This Application claims priority of U.S. Provisional Application No. 63/020,582, filed on May 6, 2020, the entirety of which is incorporated by reference herein.

BACKGROUND OF THE APPLICATION

Field of the Application

The application generally relates to wireless communications, and more particularly, to apparatuses and methods for Resource Unit (RU) allocation signaling to support Trigger-Based Physical layer Protocol Data Unit (TB PPDU) with multi-RU.

Description of the Related Art

With growing demand for ubiquitous computing and networking, various wireless technologies have been developed, including Wireless-Fidelity (Wi-Fi) which is a Wireless Local Area Network (WLAN) technology allowing mobile devices, such as a smartphone, a smart pad, a laptop computer, a portable multimedia player, an embedded apparatus, or the like, to obtain wireless services in a frequency band of 2.4 GHz, 5 GHz or 60 GHz.

The Institute of Electrical and Electronics Engineers (IEEE) 802.11 has commercialized or developed various technological standards since an initial WLAN technology is supported using frequencies of 2.4 GHz. For example, IEEE 802.11ac supports Multi-User (MU) transmission using spatial degrees of freedom via a MU-Multiple Input-Multiple-Output (MU-MIMO) scheme in a downlink (DL) direction from an Access Point (AP) to Stations (STAs). To improve the performance experienced by users of the aforementioned mobile devices, who demand high-capacity and high-rate services, IEEE 802.11ax has been proposed, which uses both Orthogonal Frequency Division Multiple Access (OFDMA) and/or MU-MIMO in both DL and uplink (UL) directions. That is, in addition to supporting frequency and spatial multiplexing from an AP to multiple STAs, transmissions from multiple STAs to the AP are also supported in IEEE 802.11ax.

In IEEE 802.11ax, a Resource Unit (RU) refers to a group of 78.125 KHz bandwidth subcarriers (tones) used in both DL and UL transmissions for a single STA, and a MU PPDU may carry multiple RUs, allowing multiple users to access an AP simultaneously and efficiently. In IEEE 802.11be, it has been agreed among IEEE members that multiple RUs may be allocated to a single STA in both DL and UL transmissions. However, the current IEEE 802.11ax specification only defines the usage scenario of RU allocation signaling for an EHT Physical layer Protocol Data Unit (PPDU) sent to multiple STAs (i.e., DL transmission), and does not define the usage scenario of RU allocation signaling for EHT Trigger-Based (TB) PPDU with multiple RUs (i.e., UL transmission).

Therefore, it is desirable to have a robust and feasible way of RU allocation signaling to support EHT TB PPDU with multi-RU.

BRIEF SUMMARY OF THE APPLICATION

In a first aspect of the application, a wireless communication terminal operating as a Station (STA) is provided. The wireless communication terminal comprises a wireless transceiver and a controller. The wireless transceiver is configured to perform wireless transmission and reception to and from an Access Point (AP). The controller is coupled to the wireless transceiver, and configured to receive a trigger frame comprising a first Resource Unit (RU) Allocation subfield which has one bit to indicate support of 320 MHz bandwidth from the AP via the wireless transceiver, determine a combination of RUs to be used in a Trigger-Based Physical layer Protocol Data Unit (TB PPDU) according to the first RU Allocation subfield, and send the TB PPDU for Uplink (UL) data transmission to the AP via the wireless transceiver in response to the trigger frame.

In a second aspect of the application, a method executed by a wireless communication terminal operating as an STA is provided. The method comprises the following steps: receiving a trigger frame comprising a first RU Allocation subfield which has one bit to indicate support of 320 MHz bandwidth from an AP; determining a combination of RUs to be used in a TB PPDU according to the first RU Allocation subfield; and sending the TB PPDU for UL data transmission to the AP in response to the trigger frame.

In a third aspect of the application, a method executed by a wireless communication device operating as an AP is provided. The method comprises the following steps: sending a trigger frame comprising a first RU Allocation subfield which has one bit to indicate support of 320 MHz bandwidth to an STA; and receiving a TB PPDU from the STA in response to the trigger frame; wherein the TB PPDU comprises a combination of RUs as indicated by the first RU Allocation subfield.

In a first implementation form of any one of the described aspects of the application, the trigger frame is an Extremely-High Throughput (EHT) trigger frame and the TB PPDU is an EHT TB PPDU in compliance with Institute of Electrical and Electronics Engineers (IEEE) 802.11be standard.

In a second implementation form of any one of the described aspects of the application in combination with the first implementation form, the first RU Allocation subfield is 9 bits long, and the bit to indicate support of 320 MHz bandwidth is introduced as the first bit of the first RU Allocation subfield.

In a third implementation form of any one of the described aspects of the application, the trigger frame further comprises a subfield for indicating a number of the RUs to be used in the TB PPDU, and a second RU Allocation subfield with the same format as the first RU Allocation subfield; and each of the first RU Allocation subfield and the second RU Allocation subfield indicates a respective one of the RUs to be used in the TB PPDU.

In a fourth implementation form of any one of the described aspects of the application in combination with the second implementation form, the third to ninth bits of the first RU Allocation subfield represent a value greater than 68 to indicate the combination of the RUs for EHT.

In a fifth implementation form of any one of the described aspects of the application in combination with the first implementation form, the trigger frame further comprises a Subtype subfield and a Trigger Type subfield, and one of the Subtype subfield and the Trigger Type subfield is set to a value for EHT identification.

Other aspects and features of the present application will become apparent to those with ordinary skill in the art upon review of the following descriptions of specific embodiments of the apparatuses and methods for RU allocation signaling to support TB PPDU with multi-RU.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
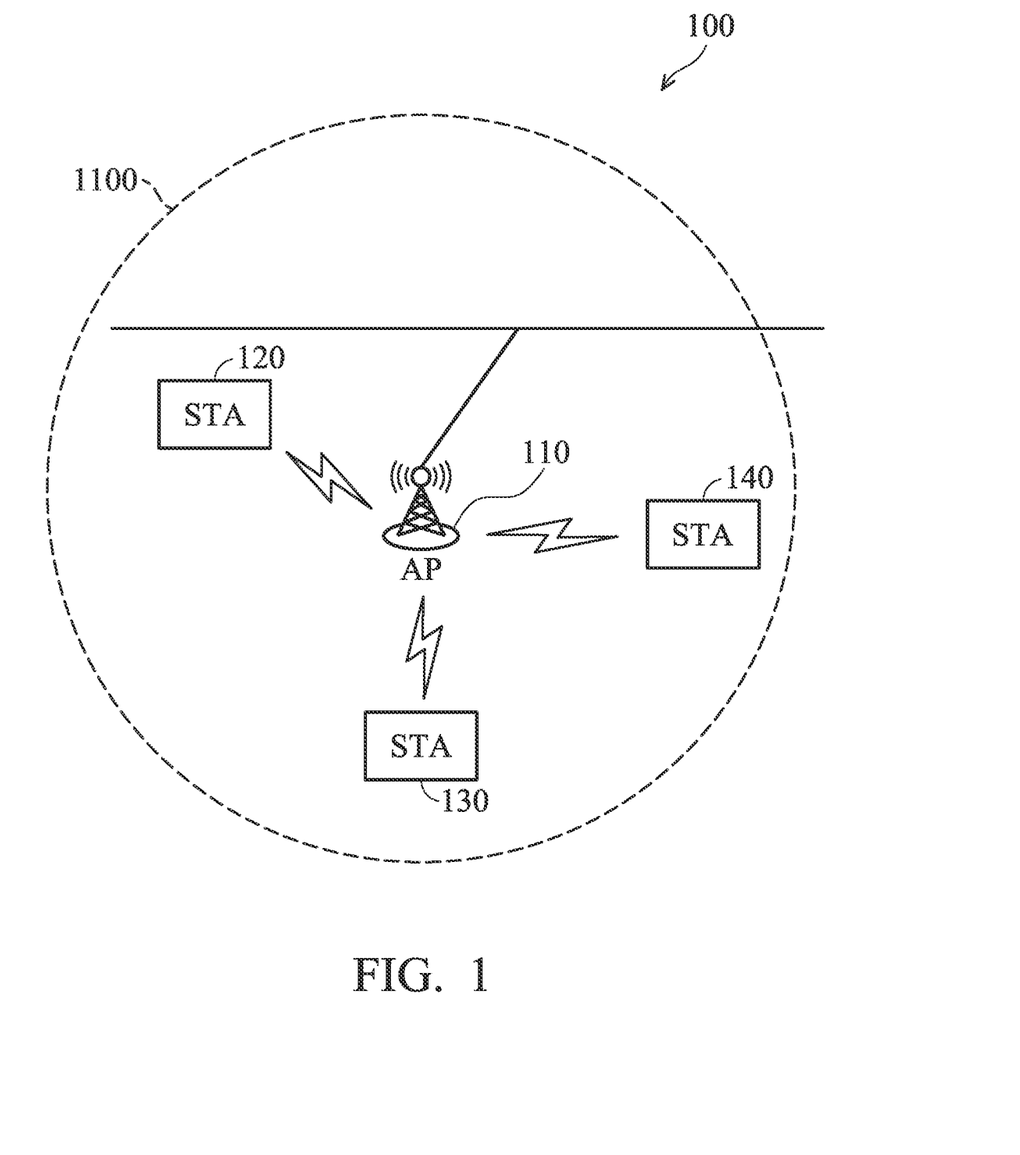
FIG. 1 is a block diagram of a wireless communication system according to an embodiment of the application.

FIG. 1 is a block diagram of a wireless communication system according to an embodiment of the application.

As shown in FIG. 1, the wireless communication system 100 includes an Access Point (AP) 110 and a plurality of stations (STAs) 120~140. The AP 110 is a wireless communication device compatible with IEEE 802.11 standards to provide and manage the access to the wireless medium for the STAs 120~140. The AP 110 has a coverage area 1100 such that STAs 120~140 within that area are within range of the AP 110. The STAs 120~140 scatter throughout the coverage area 1100. Each of the STAs 120~140 may be stationary, mobile, or a combination thereof.

In one embodiment, the AP 110 may be an Extremely-High Throughput (EHT) AP or an EHT STA operating in the AP mode, which is compatible with the IEEE 802.11be standard.

In another embodiment, the AP 110 may be an AP or an AP-mode STA which is compatible with any IEEE 802.11 standard later than 802.11be.

Each of the STAs 120~140 may be a mobile phone (e.g., feature phone or smartphone), a panel Personal Computer (PC), a laptop computer, a desktop computer, a smart TV, or any wireless communication terminal, as long as it is compatible with the same IEEE 802.11 standard as the AP 110. Each of the STAs 120~140 may operate in the non-AP mode to associate and communicate with the AP 110 for transmitting or receiving data in uplink (UL) or downlink (DL) PPDUs with multi-RU.

In accordance with one novel aspect, each of the STAs 120~140 may be triggered by the AP 110 to send uplink data in a Trigger-Based Physical layer Protocol Data Unit (TB PPDU) in which multiple RUs are allocated to a single STA. Specifically, the AP 110 may send a trigger frame to the STAs 120~140, and the trigger frame may include an RU Allocation subfield in which an additional bit is newly introduced to indicate support of 320 MHz bandwidth (i.e., the RU allocation applies to EHT). In response to the trigger frame, the STA 120/130/140 may determine the combination of RUs to be used in a TB PPDU according to the RU Allocation subfield, and send the TB PPDU for UL data transmission to the AP 110.

In accordance with another novel aspect, an additional value for EHT identification may be redefined for the Subtype subfield and/or the Trigger Type subfield of the trigger frame.

Figure 2:
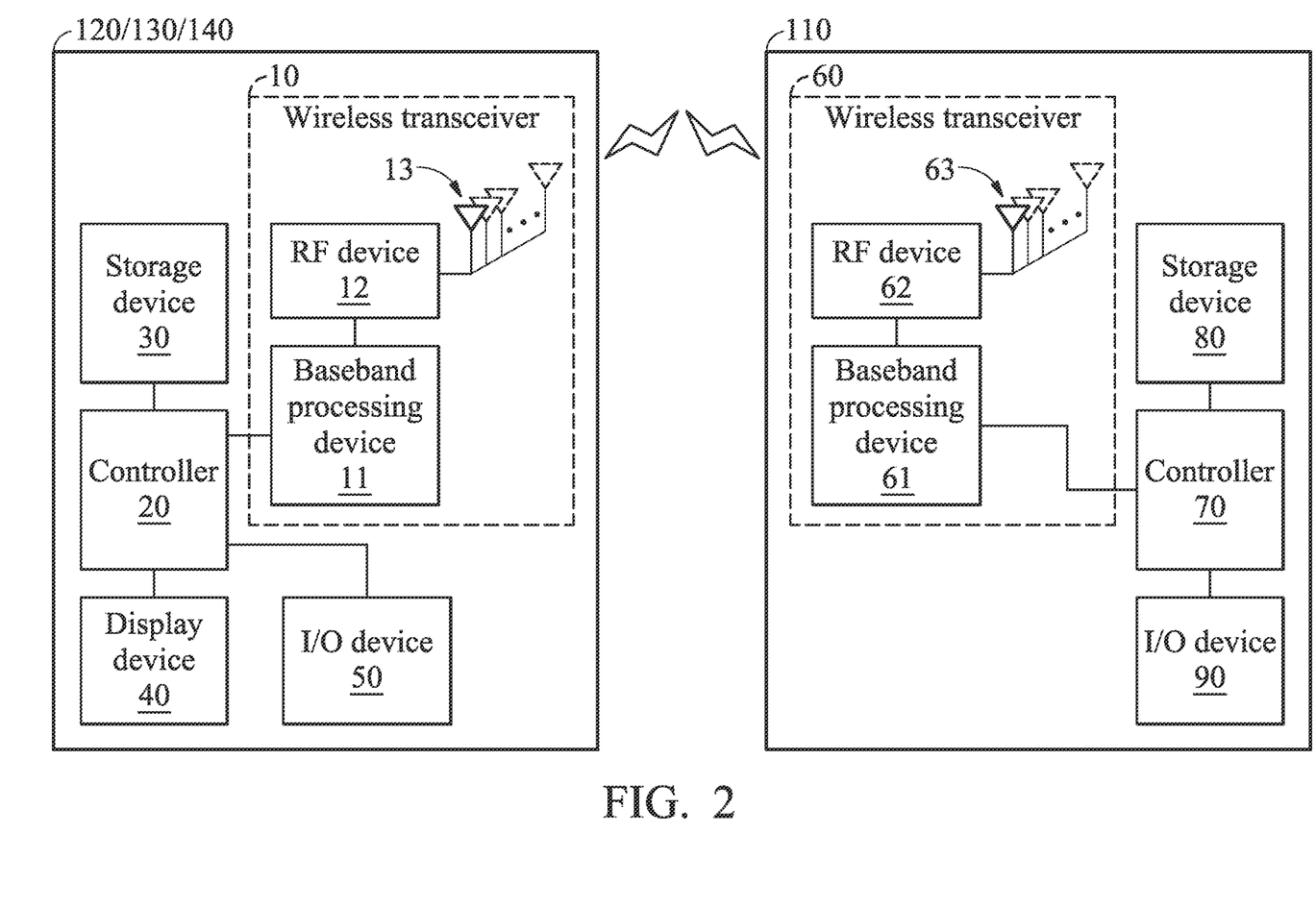
FIG. 2 is a block diagram illustrating the STA 120/130/140 and the AP 110 according to an embodiment of the application.

FIG. 2 is a block diagram illustrating the STA 120/130/140 and the AP 110 according to an embodiment of the application.

As shown in FIG. 2, the STA 120/130/140 may include a wireless transceiver 10, a controller 20, a storage device 30, a display device 40, and an Input/Output (I/O) device 50.

The wireless transceiver 10 is configured to perform wireless transmission and reception to and from the AP 110 or an AP mode STA. For example, the wireless transceiver 10 may be a Wi-Fi chip.

Specifically, the wireless transceiver 10 may include a baseband processing device 11, a Radio Frequency (RF) device 12, and antenna 13, wherein the antenna 13 may include an antenna array for UL/DL Multi-User Multiple Input-Multiple-Output (MU-MIMO).

The baseband processing device 11 is configured to perform baseband signal processing, such as Analog-to-Digital Conversion (ADC)/Digital-to-Analog Conversion (DAC), gain adjusting, modulation/demodulation, encoding/decoding, and so on. The baseband processing device 11 may contain multiple hardware components, such as a baseband processor, to perform the baseband signal processing.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may include a mixer to multiply the baseband signals with a carrier oscillated in the radio frequency of the supported cellular technologies, wherein the radio frequency may be 2.4 GHz, 5 GHz, or 60 GHz utilized in the Wi-Fi technology, or any radio frequency utilized in the future evolution of the Wi-Fi technology.

The controller 20 may be a general-purpose processor, a Micro Control Unit (MCU), an application processor, a Digital Signal Processor (DSP), or the like, which includes various circuits for providing the functions of data processing and computing, controlling the wireless transceiver 10 for wireless communications with the AP 110, storing and retrieving data (e.g., program code) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 for performing the method of the present application.

In another embodiment, the controller 20 may be incorporated into the baseband processing device 11, to serve as a baseband processor.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, the Wi-Fi protocol (of the IEEE 802.11be or another protocol version), and/or the method of the present application.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

Similarly, the AP 110 may include a wireless transceiver 60, a controller 70, a storage device 80, and an I/O device 90.

The wireless transceiver 60 is configured to perform wireless transmission and reception to and from the STAs 120~140. For example, the wireless transceiver 60 may be a Wi-Fi chip.

Specifically, the wireless transceiver 60 may include a baseband processing device 61, an RF device 62, and antenna 63, wherein the antenna 63 may include an antenna array for UL/DL MU-MIMO.

The baseband processing device 61 is configured to perform baseband signal processing, such as ADC/DAC, gain adjusting, modulation/demodulation, encoding/decoding, and so on. The baseband processing device 61 may contain multiple hardware components, such as a baseband processor, to perform the baseband signal processing.

The RF device 62 may receive RF wireless signals via the antenna 63, convert the received RF wireless signals to baseband signals, which are processed by the baseband processing device 61, or receive baseband signals from the baseband processing device 61 and convert the received baseband signals to RF wireless signals, which are later transmitted via the antenna 63. The RF device 62 may also contain multiple hardware devices to perform radio frequency conversion. For example, the RF device 62 may include a mixer to multiply the baseband signals with a carrier oscillated in the radio frequency of the supported cellular technologies, wherein the radio frequency may be 2.4 GHz, 5 GHz, or 60 GHz utilized in the Wi-Fi technology, or any radio frequency utilized in the future evolution of the Wi-Fi technology.

The controller 70 may be a general-purpose processor, an MCU, an application processor, a DSP, or the like, which includes various circuits for providing the functions of data processing and computing, controlling the wireless transceiver 60 for wireless communications with the STAs 120~140, storing and retrieving data (e.g., program code) to and from the storage device 80, and receiving user inputs or outputting signals via the I/O device 90.

In particular, the controller 70 coordinates the aforementioned operations of the wireless transceiver 60, the storage device 80, and the I/O device 90 for performing the method of the present application.

In another embodiment, the controller 70 may be incorporated into the baseband processing device 61, to serve as a baseband processor.

As will be appreciated by persons skilled in the art, the circuits of the controllers 20 and 70 may include transistors that are configured in such a way as to control the operation of the circuits in accordance with the functions and operations described herein. As will be further appreciated, the specific structure or interconnections of the transistors may be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 80 may be a non-transitory machine-readable storage medium, including a memory, such as a FLASH memory or a NVRAM, or a magnetic storage device, such as a hard disk or a magnetic tape, or an optical disc, or any combination thereof for storing data, instructions, and/or program code of applications, Wi-Fi protocol (of the IEEE 802.11be or another protocol version), and/or the method of the present application.

The I/O device 90 may include one or more buttons, a keyboard, a touch pad, a display device (e.g., LCD, LED, OLED, or EPD, etc.), a light emitting device, a microphone, and/or a speaker, etc., to serve as the MMI for interaction with users.

It should be understood that the components described in the embodiment of FIG. 2 are for illustrative purposes only and are not intended to limit the scope of the application. For example, the AP 110 or the STA 120/130/140 may include more components, such as another wireless transceiver for providing telecommunication services, a Global Positioning System (GPS) device for use of some location-based services or applications, and/or a battery for powering the other components, etc. Alternatively, the AP 110 or the STA 120/130/140 may include fewer components. For example, the STA 120/130/140 may not include the display device 40 and/or the I/O device 50.

Figure 3:
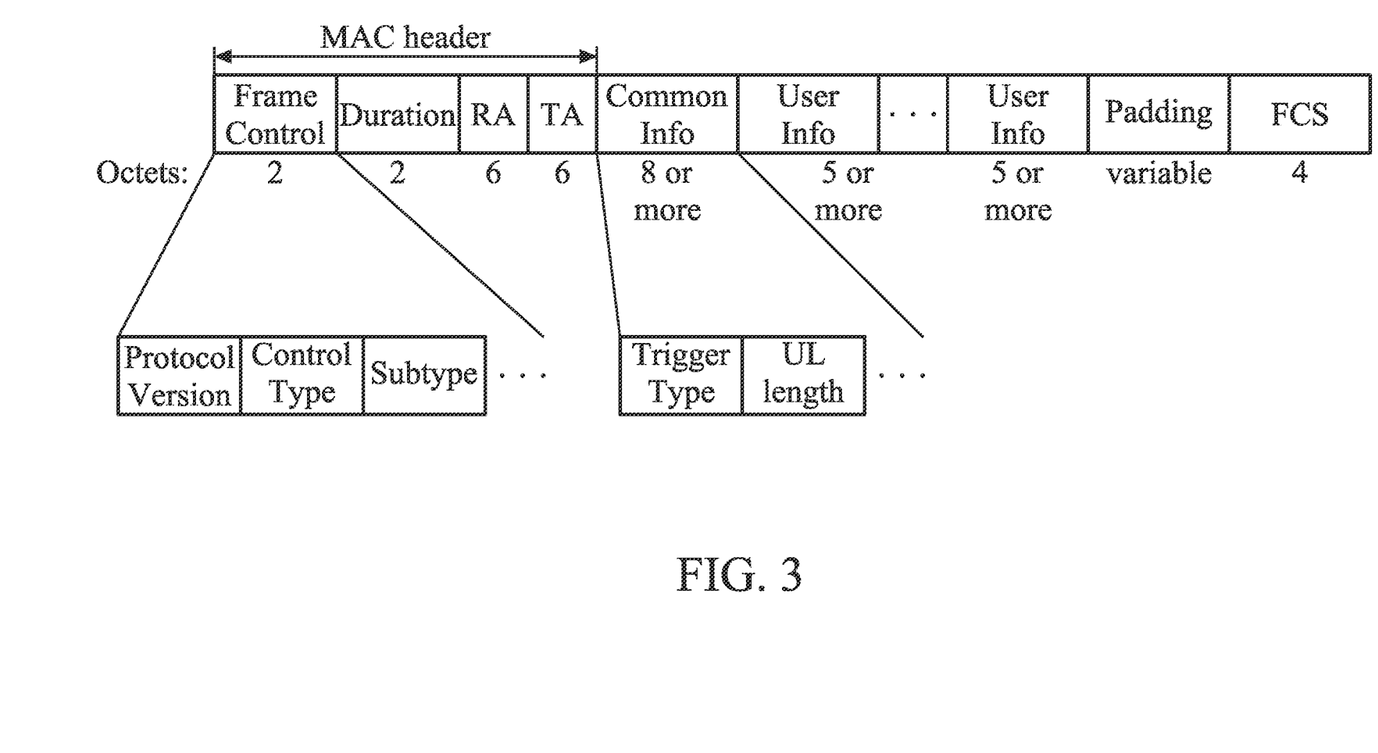
FIG. 3 is a schematic diagram illustrating the format of an EHT trigger frame according to an embodiment of the application.

FIG. 3 is a schematic diagram illustrating the format of an EHT trigger frame according to an embodiment of the application.

A trigger frame is used by an AP (or an AP mode STA) to allocate resources for and solicit one or more EHT TB PPDU transmissions. Generally, the trigger frame includes the information required by the responding STA to send an EHT TB PPDU.

Specifically, as shown in FIG. 3, an EHT trigger frame may include a Media Access Control (MAC) header, a Common Info field, a list of User Info fields, padding bit(s), and a Frame Check Sequence (FCS) field.

The MAC header is consisted of a Frame Control field, a Duration field, a Receiver Address (RA) field, and a TA field. The Frame Control field may include control information required for frame transmission/reception. The Duration field may be set to a time for transmitting the corresponding frame. The RA field may indicate the address(es) of the receiver STA(s). For example, the RA field may be set to a broadcast group address. The TA field may indicate the address of the AP/STA transmitting the EHT trigger frame.

The Common Info field may include the common information for all the triggered STAs, while each User Info field may include the information dedicated for a respective triggered STA.

It should be noted that, unlike conventional trigger frames (e.g., an HE trigger frame), the trigger frame described herein may apply to EHT by defining a new value for EHT identification in the Subtype subfield of the Frame Control field or in the Trigger Type subfield of the Common Info field. For example, the valid Control Type value and Subtype value combinations may be defined as follows in Table 1, and the Trigger Type subfield encoding may be defined as follows in Table 2.

TABLE 1

| Control Type value | Control Type description | Subtype value | Subtype description |
|---|---|---|---|
| 01 | Control | 0000-0001 | Reserved |
| 01 | Control | 0010 | Trigger |
| 01 | Control | 0101 | VHT/HE NDP Announcement |
| 01 | Control | 1010 | EHT identification |

TABLE 2

| Trigger Type value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8 | EHT identification |
| 9-15 | Reserved |

Moreover, unlike conventional trigger frames (e.g., an HE trigger frame), the EHT trigger frame described herein is enhanced for RU allocation signaling to support EHT TB PPDU with multi-RU, by modifying the RU Allocation subfield format of the User Info field. Details of such improvement will be described later in the embodiments of the following figures.

Figure 4:
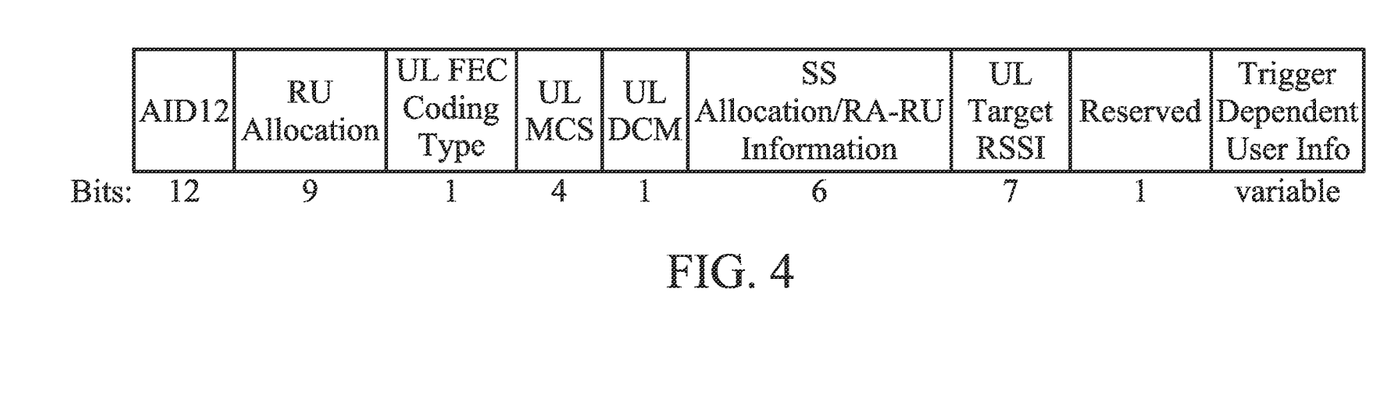
FIG. 4 is a schematic diagram illustrating the format of the User Info field of an EHT trigger frame according to an embodiment of the application.

FIG. 4 is a schematic diagram illustrating the format of the User Info field of an EHT trigger frame according to an embodiment of the application.

As shown in FIG. 4, the RU Allocation subfield of the User Info field is 9 bits long, in contrast to the 8-bit long RU Allocation subfield of the User Info field in a conventional trigger frame (e.g., an HE trigger frame).

Specifically, one additional bit is newly introduced as the first bit (i.e., B0) in the RU Allocation subfield to indicate support of 320 MHz bandwidth in EHT. For example, B0 of the RU Allocation subfield is set to 0 to indicate that the RU allocation applies to the primary 160 MHz channel of the 320 MHz bandwidth, and is set to 1 to indicate that the RU allocation applies to the secondary 160 MHz channel of the 320 MHz bandwidth.

In addition, the second bit (i.e., B1) of the RU Allocation subfield indicates whether the RU allocation applies to the primary 80 MHz channel of the 320 MHz bandwidth. For example, B1 of the RU Allocation subfield is set to 0 to indicate that the RU allocation applies to the primary 80 MHz channel, and is set to 1 to indicate that the RU allocation applies to the secondary 80 MHz channel.

Figure 5:
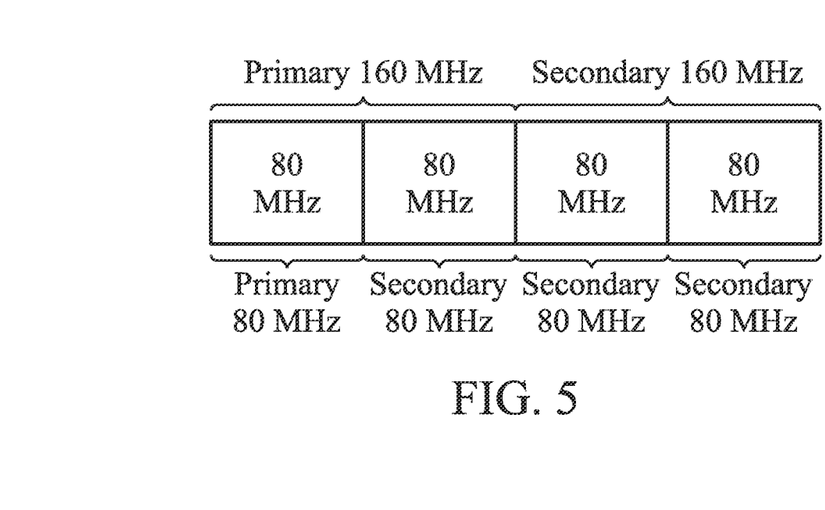
FIG. 5 is a schematic diagram illustrating the channel arrangement of a 320 MHz bandwidth according to an embodiment of the application.

FIG. 5 is a schematic diagram illustrating the channel arrangement of a 320 MHz bandwidth according to an embodiment of the application.

As shown in FIG. 5, the 320 MHz bandwidth is divided into four continuous 80 MHz channels. The 160 MHz channel consisting of the first two 80 MHz channels may be configured as the primary 160 MHz channel for EHT, and the 160 MHz channel consisting of the last two 80 MHz channels may be configured as the secondary 160 MHz channel for EHT.

Furthermore, the first 80 MHz channel in the first primary 160 MHz channel may be configured as the primary 80 MHz channel, while the other 80 MHz channels may be configured as the secondary 80 MHz channels.

Please note that the channel arrangement described in the embodiment of FIG. 5 is for illustrative purposes only and is not intended to limit the scope of the application. For example, the 160 MHz channel consisting of the last two 80 MHz channels may be configured as the primary 160 MHz channel for EHT, while the 160 MHz channel consisting of the first two 80 MHz channels may be configured as the secondary 160 MHz channel for EHT. Similarly, any 80 MHz channel other than the first 80 MHz channel may be configured as the primary 80 MHz channel.

Referring back to FIG. 4, the third to ninth bits (i.e., B2 to B8) of the RU Allocation subfield represent a value which may be set to be greater than 68 to indicate the combination of the RUs for EHT.

Specifically, the values 0-68 have been defined for legacy protocol versions in the IEEE 802.11ax standard. Due to the bandwidth increase from 160 MHz to 320 MHz in IEEE 802.11be, new values are proposed herein for EHT as follows in Tables 3 and 4.

TABLE 3

Figure 6:
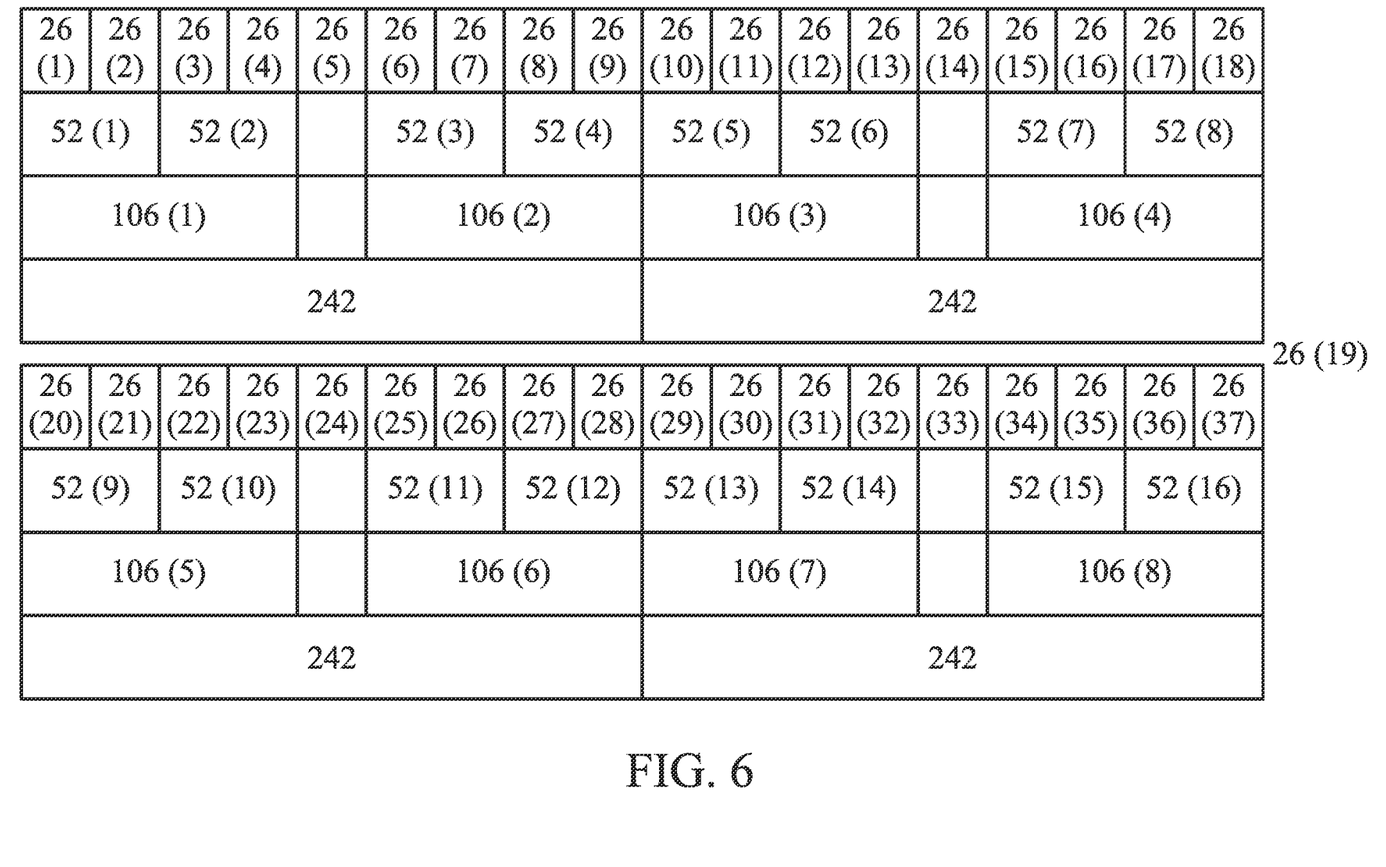
FIGS. 6 and 7 show schematic diagrams illustrating exemplary RU allocations for EHT according to an embodiment of the application.

| B8 to B2 of the RU Allocation subfield | combination of RUs used for UL BW |
|---|---|
| 69 | 52 tones (2) + 26 tones (2) |
| 70 | 52 tones (3) + 26 tones (8) |
| 71 | 52 tones (6) + 26 tones (11) |
| 72 | 52 tones (7) + 26 tones (17) |
| 73 | 52 tones (11) + 26 tones (27) |
| 74 | 52 tones (14) + 26 tones (30) |
| 75 | 106 tones (1) + 26 tones (5) |
| 76 | 106 tones (2) + 26 tones (5) |
| 77 | 106 tones (3) + 26 tones (14) |
| 78 | 106 tones (4) + 26 tones (14) |
| 79 | 106 tones (5) + 26 tones (24) |
| 80 | 106 tones (8) + 26 tones (33) |

TABLE 4

Figure 7:
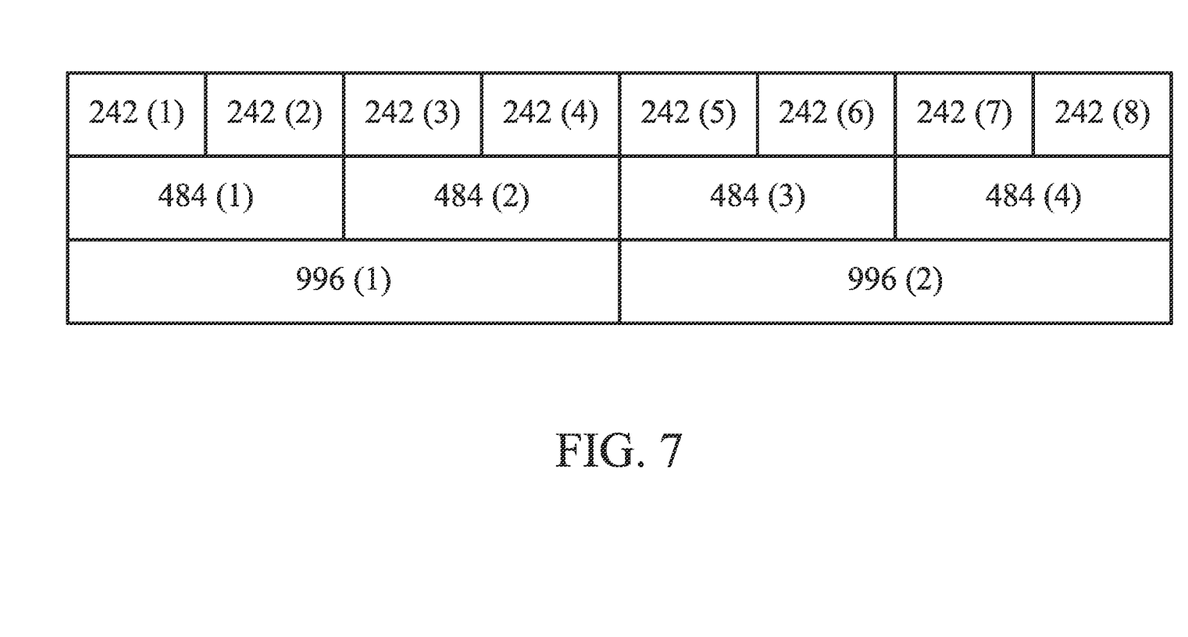

| B8 to B2 of the RU Allocation subfield | combination of RUs used for UL BW |
|---|---|
| 81 | 484 tones (1) + 996 tones (2) |
| 82 | 484 tones (2) + 996 tones (2) |
| 83 | 484 tones (3) + 996 tones (1) |
| 84 | 484 tones (4) + 996 tones (1) |
| 85 | 242 tones (1) + 484 tones (2) |
| 86 | 242 tones (2) + 484 tones (2) |
| 87 | 242 tones (3) + 484 tones (1) |
| 88 | 242 tones (4) + 484 tones (1) |
| 89 | 484 tones (2) + 242 tones (2) + 996 tones (2) |
| 90 | 484 tones (2) + 242 tones (1) + 996 tones (2) |
| 117 | 996 tones (1, 2, 3) |
| 118-127 | Reserved |

Note that the numbers in the brackets in Table 3 refer to the RUs in the exemplary RU allocation for EHT as shown in FIG. 6, and the numbers in the brackets in Table 4 refer to the RUs in the exemplary RU allocation for EHT as shown in FIG. 7.

It should be understood that 7 bits (i.e., B2 to B8) of the RU Allocation subfield can represent a total number of 128 combinations of RUs, in which 69 combinations of RUs are defined for legacy protocol versions, and thus, there are only 59 combinations of RUs left to be defined for adapting to EHT. In case there may be more than 59 combinations of RUs for adapting to EHT in the future, only one RU Allocation subfield may not be enough to represent the complete combinations of RUs in EHT. In response to such consideration, the present application proposes another solution as follows.

Figure 8:
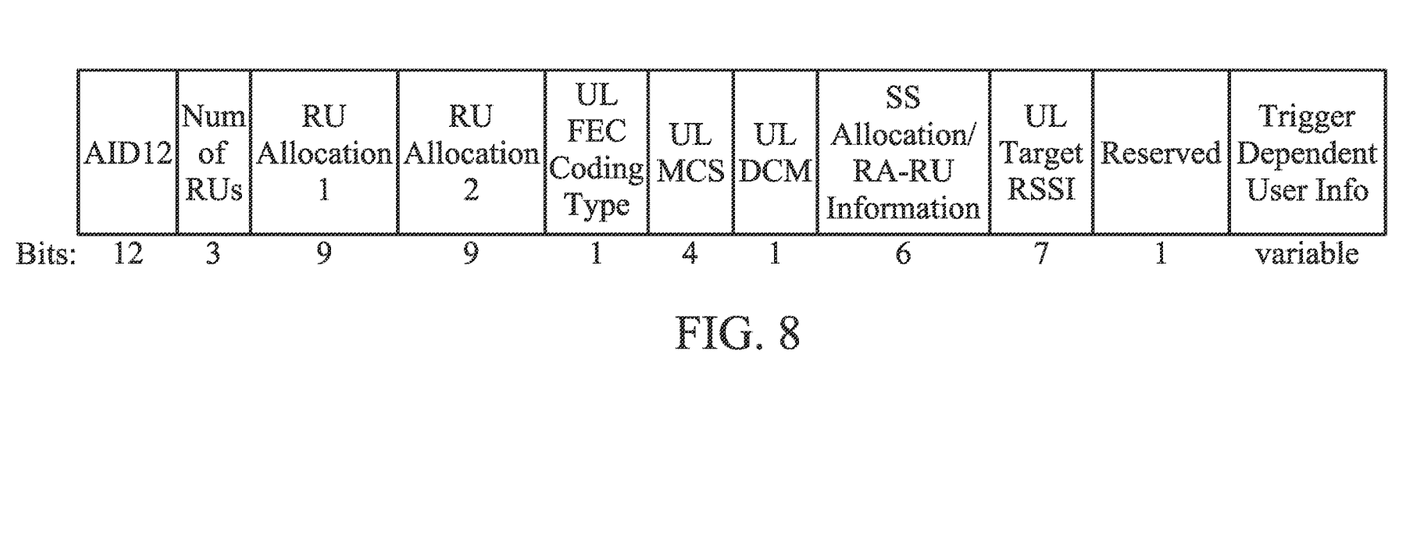
FIG. 8 is a schematic diagram illustrating the format of the User Info field of an EHT trigger frame according to another embodiment of the application.

FIG. 8 is a schematic diagram illustrating the format of the User Info field of an EHT trigger frame according to another embodiment of the application.

As shown in FIG. 8, the User Info field is extended to include additional subfields, such as a Num of RUs subfield, and one or more RU Allocation subfields. The Num of RUs subfield indicates the number of RUs to be used in a TB PPDU, and correspondingly, there are the same number of RU Allocation subfields in the User Info field. For example, the Num of RUs subfield may be 3 bits long, and indicate one RU if it's set to "000" (in binary notation), or indicate two RUs if it's set to "001".

Each RU Allocation subfield of the User Info field is 9 bits long, in contrast to the 8-bit long RU Allocation subfield of the User Info field in a conventional trigger frame (e.g., an HE trigger frame). Similar to the embodiment of FIG. 4, one additional bit is newly introduced as the first bit (i.e., B0) in the RU Allocation subfield to indicate support of 320 MHz bandwidth in EHT.

Figure 9:
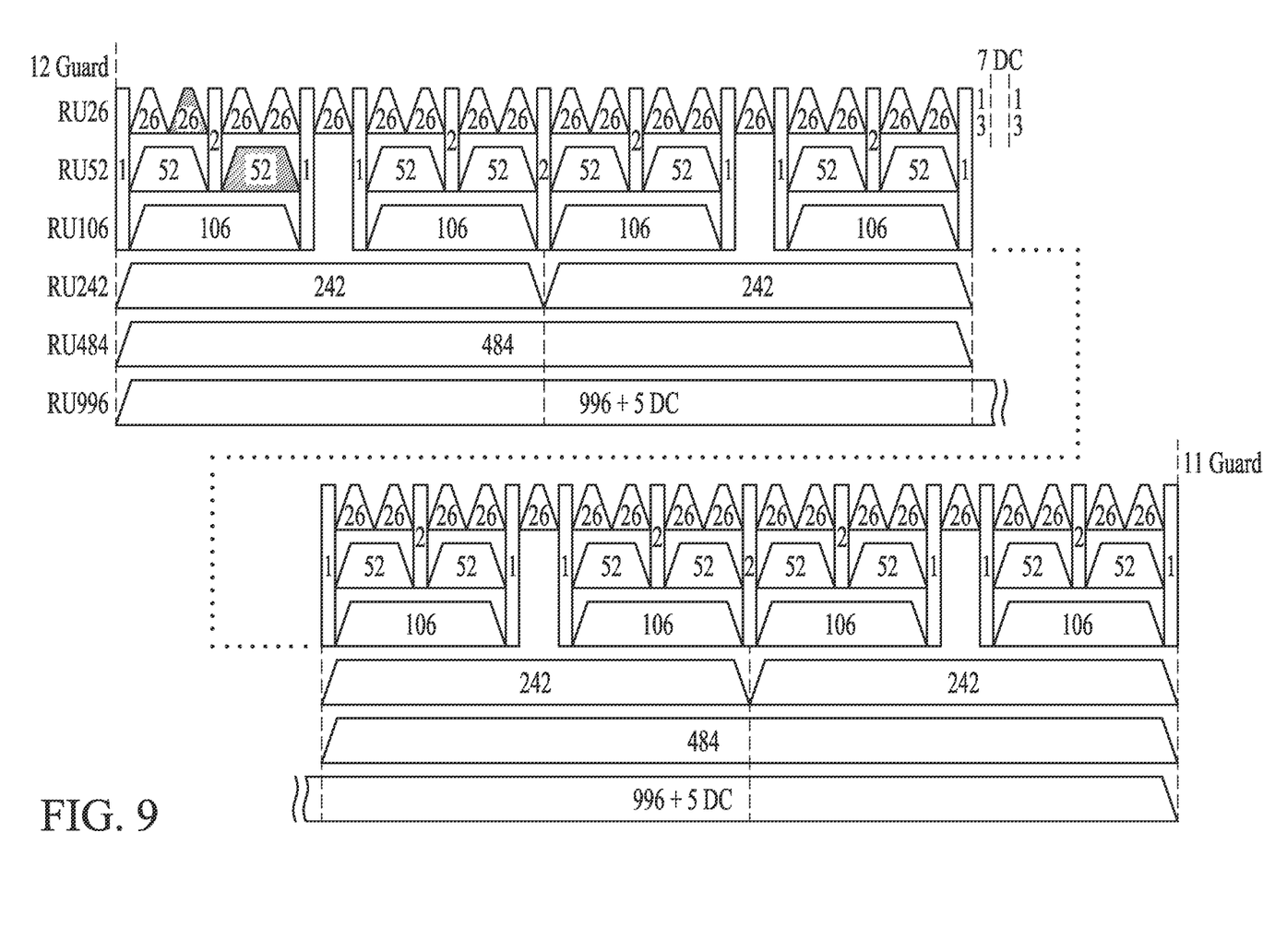
FIG. 9 is a schematic diagrams illustrating an exemplary RU allocation for EHT according to another embodiment of the application.

For example, if the Num of RUs subfield is set to "001" to indicate two RUs to be used in a TB PPDU, the first RU Allocation subfield is set to "000001000" (from B8 to B0 in binary notation), and the second RU Allocation subfield is set to "010011000", then the combination of RUs denoted with dark background in FIG. 9 may be determined.

Figure 10:
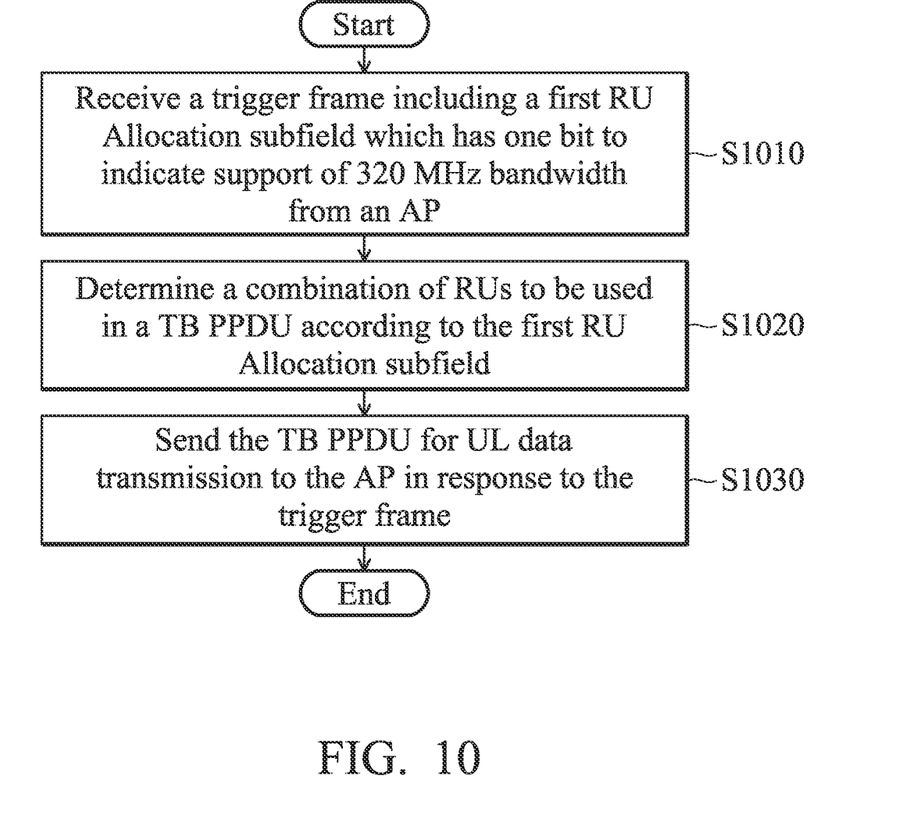
FIG. 10 is a flow chart illustrating the method for RU allocation signaling to support TB PPDU with multi-RU by an STA according to an embodiment of the application.

FIG. 10 is a flow chart illustrating the method for RU allocation signaling to support TB PPDU with multi-RU by an STA according to an embodiment of the application.

In this embodiment, the method for RU allocation signaling to support TB PPDU with multi-RU may be applied to and executed by an STA (e.g., the STA 120/130/140) supporting use of 320 MHz bandwidth.

To begin with, the STA receives a trigger frame including a first RU Allocation subfield which has one bit to indicate support of 320 MHz bandwidth from an AP (step S1010).

Next, the STA determines a combination of RUs to be used in a TB PPDU according to the first RU Allocation subfield (step S1020).

After that, the STA sends the TB PPDU for UL data transmission to the AP in response to the trigger frame (step S1030).

The trigger frame may be an EHT trigger frame and the TB PPDU is an EHT TB PPDU in compliance with IEEE 802.11be standard or any future evolution of the IEEE 802.11be.

In addition to the first RU Allocation subfield, the trigger frame may further include a Subtype subfield and a Trigger Type subfield, and one or both of the Subtype subfield and the Trigger Type subfield may be set to a value for EHT identification.

Specifically, the first RU Allocation subfield may be 9 bits long, and the bit to indicate support of 320 MHz bandwidth may be introduced as the first bit of the first RU Allocation subfield, while the third to ninth bits of the first RU Allocation subfield represent a value greater than 68 to indicate the combination of the RUs for EHT.

In one embodiment, only one RU Allocation subfield (i.e., the first RU Allocation subfield) may be used in the User Info field of the trigger frame to indicate the combination of the RUs to be used in the TB PPDU, if the third to ninth bits of the first RU Allocation subfield are enough to represent the complete combinations of RUs for EHT.

In another embodiment, two or more RU Allocation subfields may be used in the User Info field of the trigger frame to indicate the combination of the RUs to be used in the TB PPDU, if the third to ninth bits of only one RU Allocation subfield are not enough to represent the complete combinations of RUs for EHT. For example, the trigger frame may further include a Num of RUs subfield for indicating the number of the RUs to be used in the TB PPDU, and a second RU Allocation subfield with the same format as the first RU Allocation subfield, wherein each of the first RU Allocation subfield and the second RU Allocation subfield indicates a respective one of the RUs to be used in the TB PPDU.

Figure 11:
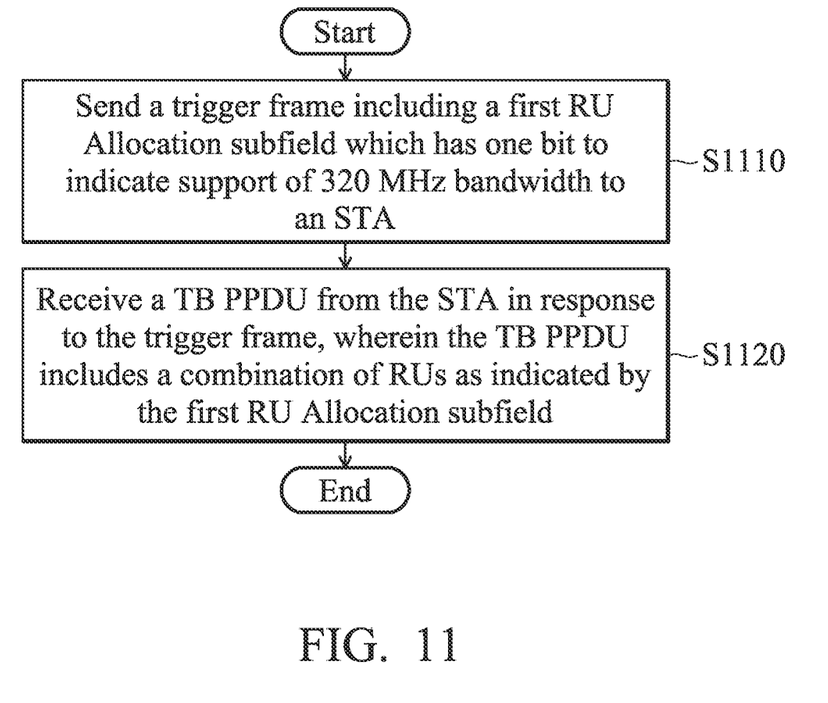
FIG. 11 is a flow chart illustrating the method for RU allocation signaling to support TB PPDU with multi-RU by an AP according to an embodiment of the application.

FIG. 11 is a flow chart illustrating the method for RU allocation signaling to support TB PPDU with multi-RU by an AP according to an embodiment of the application.

In this embodiment, the method for RU allocation signaling to support TB PPDU with multi-RU may be applied to and executed by an AP (e.g., the AP 110 or an AP mode STA) supporting use of 320 MHz bandwidth.

To begin with, the AP sends a trigger frame including a first RU Allocation subfield which has one bit to indicate support of 320 MHz bandwidth to an STA (step S1110).

Next, the AP receives a TB PPDU from the STA in response to the trigger frame, wherein the TB PPDU includes a combination of RUs as indicated by the first RU Allocation subfield (step S1120).

In view of the forgoing embodiments, it will be appreciated that the present application realizes RU allocation signaling to support EHT TB PPDU with multi-RU, by introducing an additional bit in the RU Allocation subfield of a trigger frame to indicate support of 320 MHz bandwidth and defining a new value for EHT identification in the Subtype subfield and/or the Trigger Type subfield of the trigger frame.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A wireless communication terminal, operating as a Station (STA), comprising:
    a wireless transceiver, configured to perform wireless transmission and reception to and from an Access Point (AP); and
    a controller, coupled to the wireless transceiver, and configured to receive a trigger frame comprising a first Resource Unit (RU) Allocation subfield which has one bit to indicate support of 320 MHz bandwidth from the AP via the wireless transceiver, determine a combination of RUs to be used in a Trigger-Based Physical layer Protocol Data Unit (TB PPDU) according to the first RU Allocation subfield, and send the TB PPDU for Uplink (UL) data transmission to the AP via the wireless transceiver in response to the trigger frame;
    wherein the trigger frame is an Extremely-High Throughput (EHT) trigger frame and the TB PPDU is an EHT TB PPDU in compliance with Institute of Electrical and Electronics Engineers (IEEE) 802.11be standard;
    wherein the first RU Allocation subfield is 9 bits long, and the bit to indicate support of 320 MHz bandwidth is introduced as the first bit of the first RU Allocation subfield.

2. The wireless communication terminal as claimed in claim 1, wherein the trigger frame further comprises a subfield for indicating a number of the RUs to be used in the TB PPDU, and a second RU Allocation subfield with the same format as the first RU Allocation subfield; and each of the first RU Allocation subfield and the second RU Allocation subfield indicates a respective one of the RUs to be used in the TB PPDU.

3. The wireless communication terminal as claimed in claim 1, wherein the third to ninth bits of the first RU Allocation subfield represent a value greater than 68 to indicate the combination of the RUs for EHT.

4. The wireless communication terminal as claimed in claim 1, wherein the trigger frame further comprises a Subtype subfield and a Trigger Type subfield, and one of the Subtype subfield and the Trigger Type subfield is set to a value for EHT identification.

5. A method, executed by a wireless communication terminal operating as a Station (STA), the method comprising:
    receiving a trigger frame comprising a first Resource Unit (RU) Allocation subfield which has one bit to indicate support of 320 MHz bandwidth from an Access Point (AP);
    determining a combination of RUs to be used in a Trigger-Based Physical layer Protocol Data Unit (TB PPDU) according to the first RU Allocation subfield; and
    sending the TB PPDU for Uplink (UL) data transmission to the AP in response to the trigger frame;
    wherein the trigger frame is an Extremely-High Throughput (EHT) trigger frame and the TB PPDU is an EHT TB PPDU in compliance with Institute of Electrical and Electronics Engineers (IEEE) 802.11be standard;
    wherein the first RU Allocation subfield is 9 bits long, and the bit to indicate support of 320 MHz bandwidth is introduced as the first bit of the first RU Allocation subfield.

6. The method as claimed in claim 5, wherein the trigger frame further comprises a subfield for indicating a number of the RUs to be used in the TB PPDU, and a second RU Allocation subfield with the same format as the first RU Allocation subfield; and each of the first RU Allocation subfield and the second RU Allocation subfield indicates a respective one of the RUs to be used in the TB PPDU.

7. The method as claimed in claim 5, wherein the third to ninth bits of the first RU Allocation subfield represent a value greater than 68 to indicate the combination of the RUs for EHT.

8. The method as claimed in claim 5, wherein the trigger frame further comprises a Subtype subfield and a Trigger Type subfield, and one of the Subtype subfield and the Trigger Type subfield is set to a value for EHT identification.

9. A method, executed by a wireless communication device operating as an Access Point (AP), the method comprising:
    sending a trigger frame comprising a first Resource Unit (RU) Allocation subfield which has one bit to indicate support of 320 MHz bandwidth to a Station (STA); and
    receiving a Trigger-Based Physical layer Protocol Data Unit (TB PPDU) from the STA in response to the trigger frame;
    wherein the TB PPDU comprises a combination of RUs as indicated by the first RU Allocation subfield;
    wherein the trigger frame is an Extremely-High Throughput (EHT) trigger frame and the TB PPDU is an EHT TB PPDU in compliance with Institute of Electrical and Electronics Engineers (IEEE) 802.11be standard;
    wherein the first RU Allocation subfield is 9 bits long, and the bit to indicate support of 320 MHz bandwidth is introduced as the first bit of the first RU Allocation subfield.

10. The method as claimed in claim 9, wherein the trigger frame further comprises a subfield for indicating a number of the RUs to be used in the TB PPDU, and a second RU Allocation subfield with the same format as the first RU Allocation subfield; and each of the first RU Allocation subfield and the second RU Allocation subfield indicates a respective one of the RUs to be used in the TB PPDU.

11. The method as claimed in claim 9, wherein the third to ninth bits of the first RU Allocation subfield represent a value greater than 68 to indicate the combination of the RUs for EHT.

12. The method as claimed in claim 9, wherein the trigger frame further comprises a Subtype subfield and a Trigger Type subfield, and one of the Subtype subfield and the Trigger Type subfield is set to a value for EHT identification.

13. A wireless communication terminal, operating as a Station (STA), comprising:
    a wireless transceiver, configured to perform wireless transmission and reception to and from an Access Point (AP); and
    a controller, coupled to the wireless transceiver, and configured to receive a trigger frame comprising a first Resource Unit (RU) Allocation subfield which has one bit to indicate support of 320 MHz bandwidth from the AP via the wireless transceiver, determine a combination of RUs to be used in a Trigger-Based Physical layer Protocol Data Unit (TB PPDU) according to the first RU Allocation subfield, and send the TB PPDU for Uplink (UL) data transmission to the AP via the wireless transceiver in response to the trigger frame;
wherein the first RU Allocation subfield is 9 bits long, and the bit to indicate support of 320 MHz bandwidth is introduced as the first bit of the first RU Allocation subfield;
wherein the third to ninth bits of the first RU Allocation subfield represent a value greater than 68 to indicate the combination of the RUs for EHT.

14. The wireless communication terminal as claimed in claim 13, wherein the trigger frame is an Extremely-High Throughput (EHT) trigger frame and the TB PPDU is an EHT TB PPDU in compliance with Institute of Electrical and Electronics Engineers (IEEE) 802.11be standard; or
wherein the trigger frame further comprises a subfield for indicating a number of the RUs to be used in the TB PPDU, and a second RU Allocation subfield with the same format as the first RU Allocation subfield; and each of the first RU Allocation subfield and the second RU Allocation subfield indicates a respective one of the RUs to be used in the TB PPDU; or
wherein the trigger frame further comprises a Subtype subfield and a Trigger Type subfield, and one of the Subtype subfield and the Trigger Type subfield is set to a value for EHT identification.

15. A wireless communication terminal, operating as a Station (STA), comprising:
a wireless transceiver, configured to perform wireless transmission and reception to and from an Access Point (AP); and
a controller, coupled to the wireless transceiver, and configured to receive a trigger frame comprising a first Resource Unit (RU) Allocation subfield which has one bit to indicate support of 320 MHz bandwidth from the AP via the wireless transceiver, determine a combination of RUs to be used in a Trigger-Based Physical layer Protocol Data Unit (TB PPDU) according to the first RU Allocation subfield, and send the TB PPDU for Uplink (UL) data transmission to the AP via the wireless transceiver in response to the trigger frame;
wherein the trigger frame further comprises a subfield for indicating a number of the RUs to be used in the TB PPDU, and a second RU Allocation subfield with the same format as the first RU Allocation subfield; and each of the first RU Allocation subfield and the second RU Allocation subfield indicates a respective one of the RUs to be used in the TB PPDU.

16. The wireless communication terminal as claimed in claim 15, wherein the trigger frame is an Extremely-High Throughput (EHT) trigger frame and the TB PPDU is an EHT TB PPDU in compliance with Institute of Electrical and Electronics Engineers (IEEE) 802.11be standard; or
wherein the first RU Allocation subfield is 9 bits long, and the bit to indicate support of 320 MHz bandwidth is introduced as the first bit of the first RU Allocation subfield; or
wherein the third to ninth bits of the first RU Allocation subfield represent a value greater than 68 to indicate the combination of the RUs for EHT; or
wherein the trigger frame further comprises a Subtype subfield and a Trigger Type subfield, and one of the Subtype subfield and the Trigger Type subfield is set to a value for EHT identification.

17. A wireless communication terminal, operating as a Station (STA), comprising:
a wireless transceiver, configured to perform wireless transmission and reception to and from an Access Point (AP); and
a controller, coupled to the wireless transceiver, and configured to receive a trigger frame comprising a first Resource Unit (RU) Allocation subfield which has one bit to indicate support of 320 MHz bandwidth from the AP via the wireless transceiver, determine a combination of RUs to be used in a Trigger-Based Physical layer Protocol Data Unit (TB PPDU) according to the first RU Allocation subfield, and send the TB PPDU for Uplink (UL) data transmission to the AP via the wireless transceiver in response to the trigger frame;
wherein the trigger frame is an Extremely-High Throughput (EHT) trigger frame and the TB PPDU is an EHT TB PPDU in compliance with Institute of Electrical and Electronics Engineers (IEEE) 802.11be standard;
wherein the trigger frame further comprises a Subtype subfield and a Trigger Type subfield, and one of the Subtype subfield and the Trigger Type subfield is set to a value for EHT identification.

18. The wireless communication terminal as claimed in claim 17, wherein the first RU Allocation subfield is 9 bits long, and the bit to indicate support of 320 MHz bandwidth is introduced as the first bit of the first RU Allocation subfield; or
wherein the trigger frame further comprises a subfield for indicating a number of the RUs to be used in the TB PPDU, and a second RU Allocation subfield with the same format as the first RU Allocation subfield; and each of the first RU Allocation subfield and the second RU Allocation subfield indicates a respective one of the RUs to be used in the TB PPDU; or
wherein the third to ninth bits of the first RU Allocation subfield represent a value greater than 68 to indicate the combination of the RUs for EHT.

* * * * *